United States Patent

[11] 3,588,350

| | | | |
|---|---|---|---|
| [72] | Inventor | Carlos S. Higashide Chicago, Ill. | |
| [21] | Appl. No. | 834,810 | |
| [22] | Filed | June 19, 1969 | |
| [45] | Patented | June 28, 1971 | |
| [73] | Assignee | GTE Automatic Electric Laboratories Incorporated Northlake, Ill. | |

[54] WIDE-BAND DC COUPLED CABLE TRANSMISSION CIRCUIT INDEPENDENT OF GROUND CIRCUIT VOLTAGE VARIATIONS
6 Claims, 1 Drawing Fig.

[52] U.S. Cl. .................................................. 178/68,
178/69, 178/88, 325/26, 325/65, 325/381,
325/386, 333/33
[51] Int. Cl. ...................................................... H04l 15/00
[50] Field of Search ........................................... 178/69 (D),
88, 68, 67; 325/381, 386, 26, 65, 378, 373, 376;
333/32, 33, 8, 9

[56] References Cited
UNITED STATES PATENTS
3,339,022  8/1967  Abramson et al. ............  178/88

*Primary Examiner*—Robert L. Griffin
*Assistant Examiner*—Albert J. Mayer
*Attorneys*—Cyril A. Krenzer, K. Mullerheim, B. E. Franz and Glenn H. Antrim

ABSTRACT: Input circuits of receivers connected to cables in fast-operating logic systems are isolated from noise and voltage differences in return circuits common to groups of logic circuits interconnected by the cables. The receiving end of each line of a cable is connected to the bases of a pair of complementary transistors of a receiver, and an output circuit is connected between their collectors. Either direct-current pulses or high-frequency pulses can be received even if a common return circuit is not connected between the groups of logic circuits.

PATENTED JUN28 1971 3,588,350
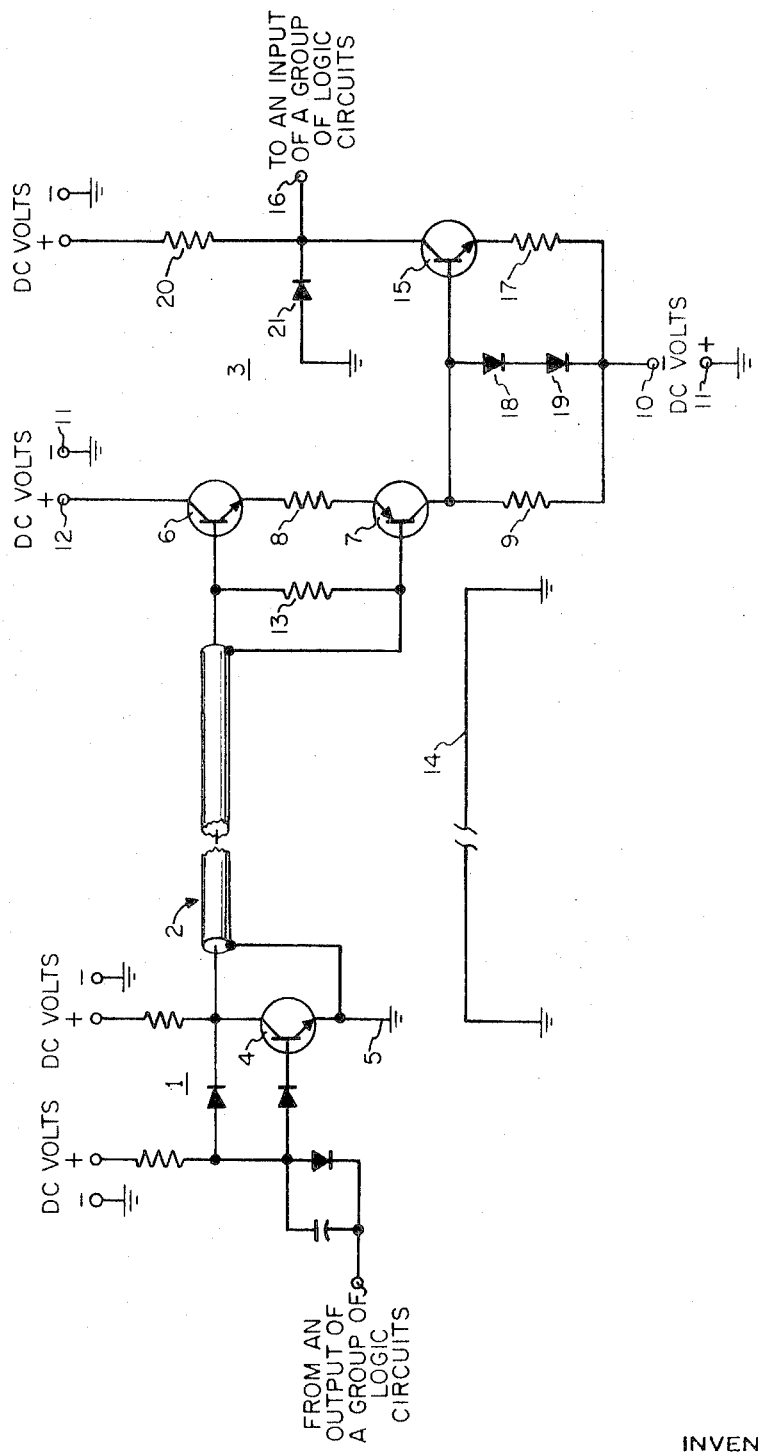
INVENTOR
CARLOS S. HIGASHIDE
BY Glenn H. Antrim
ATTORNEY

WIDE-BAND DC COUPLED CABLE TRANSMISSION CIRCUIT INDEPENDENT OF GROUND CIRCUIT VOLTAGE VARIATIONS

BACKGROUND OF THE INVENTION

This invention pertains to wide-frequency band receivers, connected to transmission lines interconnecting logic circuits, to receive from cable drivers all signals in a range from constant direct-current signals with indefinite periods to short pulses transmitted at high frequency rates.

In large, fast-operating, logic systems, distances between different groups of logic circuits are sufficient to require transmission lines to interconnect the operating circuits of the different groups. Since the characteristic impedance of the lines is quite low, and since enough current must be applied across the characteristic impedance to develop at their receiving ends, sufficient voltage to operate logic circuits, a cable driver and a receiver are connected between opposite ends of each line of the cables and respective logic groups. Typically, in slow-to-medium speed logic systems, the transmitters and the receivers are single-stage transistorized amplifiers.

Usually each group of logic circuits has a common return or ground circuit, and a common return circuit for the system of logic circuits interconnects the common return circuits of the different groups. In former systems, transmission of signal pulses in the range from direct-current to high frequency rates over any line of a group is not confined to two conductors of the line, and the transmitted signal induces currents into the system common return circuit to cause voltage differences between the return circuits for the different groups. When the transit time of the signal along a cable is appreciable compared with the rise times of the pulses, sufficient interfering voltages are generated in the system common return circuit to provide incorrect operation of the receiver because the currents in the input and the output circuits of the receiver are not independent of variations in voltage along the common return circuits unless the impedance of the common return circuit is reduced to an impractical, negligible amount. Also, average direct-current voltage differences often exist between common return circuits and interfere with transmission of either direct-current signals or low frequency signals.

In former circuits not requiring transmission of low frequency pulses, either capacitive or inductive coupling devices are connected in the line circuits between a transmitter and a respective receiver. Differences in direct-current levels between common return circuits cannot affect the receiver input.

Other circuits using single-stage transistorized amplifiers are suitable for transmission of direct-current signals and high frequency binary signals for short distances over two-conductor lines. The transistors in the amplifiers are operated in a saturated state during conduction and therefore the receiver signal circuits are then effectively connected through the transistors to a common return circuit. These systems fail when differences in direct-current voltage between common return circuits become significant with respect to signal voltage levels. Noise and ringing (damped oscillations) generated in the common return circuits prevent high frequency transmission when the rise time of the pulses approach the transit time of the signal along an interconnecting line.

SUMMARY OF THE INVENTION

A receiver in each line of a cable has two complementary transistors. The emitter of one transistor is connected through a resistor to the emitter of the other to connect the emitter-collector circuits of the transistors in series, and the collectors are connected in an output circuit. The input circuit is connected to confine all current of incoming signals to the conductors of the respective line of a cable by connecting a resistor between the conductors to terminate the line at its characteristic impedance and connecting the base of each transistor to a respective one of the terminated conductors.

The current flow to the bases is small compared with the current flow in the terminating resistor, and any difference in current flow between the two conductors is the difference in the base currents caused by difference in characteristics of the two receiver transistors. When the transistors have matched characteristics and the difference in the base currents is zero, common return circuits are not required between the driver and the receiver for either direct-current operation or high frequency operation. When conducting, the transistors are operated below a point of saturation so that the collector-to-base impedance is high for voltage changes in the emitter-collector circuit of the receiver caused by changes in the source of direct-current operating voltage, or for differences in voltage in the system common return circuit which is applied to the source of voltage. In systems using a complete system return circuit, voltage variations between the return circuits for different groups of logic circuits do not affect significantly current flow in the output circuit until the difference in voltage approaches values determined by the direct-current operating voltage applied between the collectors of the transistors. Also during high frequency transmission, signal current is confined to a respective two-conductor line, and little signal current is present in common return circuits to generate noise.

BRIEF DESCRIPTION OF THE DRAWING

The single FIGURE is a schematic diagram of the cable transmission system connecting two separated groups of logic circuits.

DESCRIPTION OF THE PREFERRED EMBODIMENT

A cable driver 1 has an input connected to one group of logic circuits and its output connected to one end of a coaxial cable 2. The other end of the coaxial cable 2 is connected to the input of a receiver 3, and the output of the receiver is connected to an input of another group of logic circuits. A transmission line consisting of a twisted pair of conductors may be substituted for the coaxial cable 2 in systems in which the signals to be transmitted have somewhat lower frequencies or the length of the cable is somewhat shorter. The driver stage shown in the drawing has a transistor 4 connected in a conventional common-emitter amplifier circuit. The output of the transistor 4 is connected between the conductors of the coaxial cable 2, the collector of the transistor 4 being connected to the inner conductor of the cable, and the emitter being connected to the outer conductor. The outer conductor is also connected to the common return circuit 5 associated with the logic circuits to which the transmitter is connected. The driver as shown is suitable for a transmission system connected between electronic control circuits of a telephone office to provide 6-volt pulses with rise and fall times of 10 to 20 nanoseconds between the conductors of a line which has a characteristic impedance of 100 ohms. Any other type of driver supplying the required output voltage at a required repetition rate can be used with the receiver 3 of this invention.

The receiver having an input connected to the line 2, includes a type NPN transistor 6 and a complementary type PNP transistor 7. The conductors of the line 2 are connected to respective bases of the transistors, and the emitter-collector circuits of both transistors and an output circuit are connected in series. In the series emitter-collector circuit, a resistor 8 is connected between the emitters of the transistors 6 and 7; the collector of the transistor 7 is connected to a load circuit, including resistor 9, to the negative terminal 10 of a source of voltage; a positive terminal of the source of voltage is connected to a ground 11 representing the common return circuits for a group of logic circuits with which the receiver 3 is associated; and finally to complete the series circuit, the collector of the transistor 6 is connected to the positive terminal 12 of a source of direct-current voltage which also has its negative terminal connected to the common return circuit 11.

Usually in logic circuits, binary signals are received, and the transistors 6 and 7 are conductive for one level of the signal and nonconductive for the other level. During the nonconductive state, the input circuits, connected to the bases of the transistors 6 and 7, are obviously isolated from the output circuit of the receiver and also from the receiver common return circuit to which the output circuit is connected. During conduction of the transistors 6 and 7, the receiver common return circuit is isolated from the input base circuit because variation in the voltage of this return circuit relative to the receiver input is applied only between the respective collectors and bases of the transistors 6 and 7. The transistor 6 is connected in an emitter-follower arrangement to maintain constant emitter current while the input base current is constant. Diodes 18 and 19 are connected in series as clamping diodes across the resistor 9 that is connected in series with the collector circuit of the transistor 7 so that the direct-current voltage difference between the collector of the transistor 7 and the negative voltage applied to the terminal 10 never exceeds the sum of the forward voltage drops across the diodes. This regulation of the voltage on the collector of the transistor 7 and the emitter-follower arrangement of the transistor 6 prevents saturation of the transistors over a wide variation of input base voltage with respect to the common return circuit connected to the source of collector voltage. Therefore noise signals on the common return circuit 11 and variations in emitter-collector supply voltage do not effect the emitter-collector current; that is, high impedance to voltage changes exists between the emitter-collector circuits and the bases of the transistors 6 and 7.

In order to apply signal from the driver 1 to the receiver 3, the base of the transistor 6 is connected to the center conductor of the coaxial cable 2, and the base of the transistor 7 is connected to the outer conductor of the cable. A resistor 13 is connected across the line 2 to provide termination of the line at its characteristic impedance. Since the impedance between the bases of the transistors 6 and 7 is high compared with the characteristic impedance, and the impedances between the respective bases and collectors are still higher, the driver system is effectively isolated from the receiver output circuits.

The only direct connection between ground and the cable 2 is the connection to the common return circuit 5 of the logic circuits associated with the driver 1. When the β and leakage current characteristics of the transistors 6 and 7 are matched, the currents in the different conductors of the line 2 are equal, and no signal current flows through a system common return circuit represented by the conductor 14. The line 2, suitable for high frequency signal transmission, provides a complete direct-current circuit for the input of the receiver so that pulses over a wide range of frequencies including sustained direct-current pulses can be transmitted without the use of the system common return circuit represented by the conductor 14. Usually a system common return circuit is desirable, and transistors are not selected to obtain pairs with matched characteristics. However, the return circuit represented by the conductor 14 can be an inexpensive conductor with moderate resistance because signal currents in the return circuit are small even though the transistors 6 and 7 have unmatched characteristics.

Since the input of the receiver 3 does not effectively include the local common return circuit, quiet large voltage differences can exist between the local common return circuits, the voltage differences often being present even though a system common return circuit 14 is used, without changing the desired conductive state of the receiver transistors 6 and 7. The change in voltage on both input bases simultaneously does not change the conductivity until the signal voltage plus the difference in voltage between the local common return circuits approaches the direct-current operating voltage applied either to the collector of the transistor 6 or to the collector of the transistor 7. In systems in which the receiver input is not effectively isolated from the common return circuits, ringing (damped oscillations) in the common return circuit causes distorted waveforms or echo pulses to interfere with high frequency transmission. Since in the present circuit the transmission characteristics of high frequency pulses are dependent entirely upon the transmission line connected between the two groups of logic circuits, and ground currents due to these signals between the two groups of logic circuits do not exist, pulses can be transmitted with a minimum of distortion.

In a preferred embodiment, signal developed across the receiver output load resistor 9 is applied through a buffer amplifier stage to an output terminal 16 connected to an input of a group of logic circuits. The buffer amplifier stage includes a type NPN transistor 15 connected in a common emitter configuration. The emitter of the transistor 15 is connected through a bias resistor 17 to the terminal 10 which is connected to a source of direct-current voltage. The series diodes 18 and 19 connected in series across the resistor 9 also function as a voltage clamp across the base-emitter input circuit of the transistor 15. The collector of the transistor 15 is connected through a resistor 20 to the positive terminal of the source of direct-current voltage; the collector is also connected to the output terminal 16 and to a clamping circuit comprising a diode 21. The clamping circuits not only prevent saturation of the transistor 15 but limit the output voltage of the receiver to a safe value for succeeding electronic circuits by clamping the output to a negative voltage equal to the amount of the voltage drop across the diode 21.

Without affecting the operation of the receiver 3, the voltage of one polarity between the ends of the system common return circuit 14 can change by an amount determined by the voltage of the source connected to the collector of the transistor 6, and voltage of the other polarity can change by an amount determined by the voltage connected to the terminal 10 less the voltage across the clamping circuit comprising the diodes 18 and 19. If the transistors in the receiver are connected in the polarity shown in the diagram, the amount by which the receiver common return circuit can become negative with respect to the driver common return circuit is limited to a voltage somewhat less than the collector voltage of the transistor 6 minus the voltage of the transmitted signal, and the positive change is limited to a voltage somewhat less than the voltage applied to the terminal 10.

I claim:

1. In a pulse transmission system including a transmission line having first and second conductors, a cable driver connected between said conductors at one end of said line, said driver being capable of applying to said line, pulses ranging in periods from indefinitely long direct-current periods to short periods required for transmission at high frequency rates, and a receiver connected to the other end of said line; said receiver comprising:

first and second transistors of complementary types, each having am emitter, a base, and a collector, the base of said first transistor and the base of said second transistor being connected to said first and second conductors respectively, a first resistor connected between said emitters to connect serially the emitter-collector circuits of said transistors, an output circuit and a source of direct-current connected between said collectors of said transistors, the current flow in said emitter-collector circuits remaining relatively constant in response to application of voltage of predetermined level to said line by said cable driver, and said receiver reproducing in said output circuit said applied pulses of long duration as well as those of short duration independent of a common return circuit between said cable driver and said receiver.

2. A receiver according to claim 1 in which a transmitter common return circuit is connected to said first conductor at said one end of said line, a receiver common return circuit is connected to said source of current for said receiver, and a system common return circuit is connected between said transmitter common return circuit and said receiver common return circuit, and in response to application of pulses of predetermined amplitude from said cable driver to said line the conductivity of said transistors remain relatively constant independent of substantial noise current induced into said line and said system common return circuit and also independent of substantial direct-current voltage change between said transmitter common return circuit and that end of said system common ground return circuit connected to said receiver.

3. In a receiver according to claim 2 in which a second resistor is connected between said bases to terminate sail line.

4. A receiver according to claim 3 in which said output circuit includes a third resistor and a first diode voltage clamping circuit connected in parallel.

5. A receiver according to claim 4 in which a buffer amplifier stage has its input connected across said parallel third resistor and said first diode voltage clamping circuit, the output circuit of said buffer stage being the output circuit of said receiver.

6. A receiver according to claim 5 in which said buffer amplifier stage includes a third transistor having an emitter, a base, and a collector, the input circuit of said buffer amplifier stage being the emitter-collector circuit of said third transistor, said output circuit of said receiver being connected to the collector of said third transistor, and a second diode voltage clamping circuit connected to said collector.